United States Patent [19]

Dobrica

[11] Patent Number: 5,875,215

[45] Date of Patent: Feb. 23, 1999

[54] CARRIER SYNCHRONIZING UNIT

[75] Inventor: Vasic Dobrica, Tokyo, Japan

[73] Assignee: NEC Corporation, Tokyo, Japan

[21] Appl. No.: 701,072

[22] Filed: Aug. 21, 1996

[30] Foreign Application Priority Data

Aug. 25, 1995 [JP] Japan .................................. 7-240896

[51] Int. Cl.$^6$ .............................................. H04L 27/06
[52] U.S. Cl. .......................... 375/344; 375/231; 375/325; 375/326; 375/324; 375/232; 375/233; 375/332
[58] Field of Search .................................. 375/231, 326, 375/325, 324, 232, 233, 332, 344

[56] References Cited

U.S. PATENT DOCUMENTS

| | | | |
|---|---|---|---|
| 5,140,615 | 8/1992 | Jasper et al. | 375/347 |
| 5,293,401 | 3/1994 | Serfaty | 375/231 |
| 5,659,578 | 8/1997 | Alamouti et al. | 375/261 |

FOREIGN PATENT DOCUMENTS

| | | |
|---|---|---|
| 6188785 | 7/1994 | Japan . |
| 746284 | 2/1995 | Japan . |
| 7162361 | 6/1995 | Japan . |
| 7264110 | 10/1995 | Japan . |
| 9535615 | 12/1995 | WIPO . |

OTHER PUBLICATIONS

The Transactions of the Institute of Electronics, Information And Communication Engineers, vol. J72–B–II No. 1, Jan. 1989, pp. 1–62., Rayleigh Fading Compensation Method for 16QAM Modem in Digital Land Mobile Radio Systems, Seiichi Sampei.

The Institute of Electronics Information and Communication Engineers, Performance of Coherent RAKE Detection using Interpolation on DS/CDMA, Akihiro Higashi, Tsutomu Taguchi, and Koji Ohno, vol. 94 No. 312. Oct. 1994.

*Primary Examiner*—Stephen Chin
*Assistant Examiner*—Tuan Le
*Attorney, Agent, or Firm*—Ostrolenk, Faber, Gerb & Soffen, LLP

[57] ABSTRACT

A carrier synchronizing unit for a coherent detection data communication system over non-frequency selective fading channels wherein the redundancy in estimation of a fading channel multiplicative distortion is reduced to improve the reliability of the estimation and compensate for an influence of a tracking delay in recursive least square estimation. The carrier synchronizing unit combines pilot symbols interpolation and recursive least square type phase and amplitude estimation. Carrier synchronizing unit comprises pilot symbol interpolation type phase and amplitude means for interpolating pilot symbols to estimate fading channel multiplicative distortion for the purpose of pre-detection, recursive least square type phase and amplitude estimation means to estimate fading channel multiplicative distortion in the second estimation stage, distortion compensation means to compensate fading distortion, symbol decision means for deciding a received data symbols using coherent detection, delay means for delaying a received signal, and means for periodically training of the recursive least square type phase and amplitude means. The fading channel multiplicative distortion is estimated in the second stage using a recursive least square method which minimizes a time-weighted square error.

11 Claims, 4 Drawing Sheets

CARRIER SYNCHRONIZING UNIT

BACKGROUND OF THE INVENTION

1. Field of the Invention

This invention relates to a cellular telephone system, and more particularly to a carrier synchronizing unit for a coherent detecting data communication system over non-frequency selective fading channels.

2. Description of the Related Art

Coherent detection schemes are superior compared to differential coherent or noncoherent schemes in terms of power efficiency. However, carrier recovery required for coherent detection is influenced by a time-varying characteristic of a fading channel. The power efficiency presented by coherent detection in a digital communication system is effective only when a carrier synchronizing unit is provided for a receiver.

In order to obtain a good result in carrier synchronism, it is required to accurately estimate complicated fading distortion.

Rapid fading is a central subject to be solved in digital mobile communication. For convenience of mounting or because of the lack of robust phase estimation algorithms, a differential detection technique or some other noncoherent technique has been traditionally used in a fading channel. A considerable improvement in performance can be achieved if near coherent demodulation is realized.

A linear demodulation system which employs coherent reception such as multi-phase shift keying (MPSK) or multi-quadrature amplitude modulation (M-QAM) potentially forms a preferable communication scheme.

The advantage in power efficiency of coherent detection over noncoherent detection really arises when channel coding or cochannel interference is taken into consideration.

When the channel is distorted by Rayleigh fading and the channel phase varies rapidly, an efficient carrier synchronizing technique wherein a phase is extracted from a received signal should be used for a coherent demodulation system.

Employment of an adaptive algorithm based on a recursive least square method (which is be hereinafter referred to simply as RLS) for estimation of a multiplicative distortion of a fading channel, equivalent to estimation of a phase and an amplitude of a carrier, improves the accuracy in estimation, reduces the influence of additive noise upon the estimated value and enhances the reliability of the estimated value. However, in order that variations in amplitude and phase caused by modulation of a carrier in order to transmit data may be identified from distortions by fading, the modulation must be removed.

This indicates that a decision-directed carrier synchronization architecture is required. Decision-directed processing (a method wherein, using a result of a decision, next processing is performed) has a hang-up phenomenon similar to that of a phase locked loop (PLL), and is furthermore restricted in that only a causal phase and amplitude estimation method can be used.

An exemplary one of many methods of non-causal phase and amplitude estimation is smoothing processing. The smoothing method improves the phase and amplitude estimation performance since a reference estimated value at the current point of time is produced using a value of a multiplicative distortion of a signal which is received later in time. However, such a signal later in time cannot be used in the decision-directed carrier synchronization architecture.

The weighting coefficient for an adaptive algorithm based on the recursive least square method must have a value close to "1" in order to minimize the influence of noise in an estimated value of the multiplicative transmission line distortion.

As the weighting coefficient increases, the influence of the additive noise decreases, but the response speed to the variation in multiplicative distortion decreases. As the weighting coefficient increases, the convergence of an RLS estimator decreases, which gives rise to a tracking delay in estimation. The tracking delay is disruptive in the decision-directed carrier synchronization architecture and leads to a burst error.

If both components (a real number component and an imaginary number component) of a multiplicative distortion become small at the same time (a base band equivalent at fading distortion is represented as a multiplication by time-varying complex number values), the amplitude is decreased significantly and a large variation in phase is caused.

Such rapid phase variation causes difficulties in a phase tracking system such as a decision-directed synchronization system. Furthermore, the tracking delay gives rise to errors in symbol decision and further deteriorates the estimation as the thus produced wrong symbols are used for estimation, which leads to a phase error and hang-up of the carrier synchronizing unit.

A combination of predictions based on a least squares fading memory fitting (curve fitting) and extrapolation and the recursive least square method brings about improvement in carrier tracking capability and minimizes the hang-up phenomenon.

Indeed, the hang-up phenomenon is minimized by such a method as described above, but it is impossible to completely eliminate the hang-up phenomenon.

In contrast, a method of interpolating pilot symbols can be readily realized. A receiver interpolates a channel measurement value provided by pilot symbols in order to obtain phase and amplitude references for detection.

However, ordinary symbol interpolation such as linear interpolation, interpolation by means of a lowpass filter or Gaussian interpolation has redundancy, and unless a pilot symbol rate is increased, the multiplicative distortion of a fading channel cannot be accurately estimated.

In order to achieve optimum interpolation, the Winer filter has been proposed. The Winer filter is a linear filter which has a load function which minimizes the square mean value of an error e(t) between an aimed value and the output. With the Winer filter, although the redundancy can be reduced, a large amount of calculation is still required.

SUMMARY OF THE INVENTION

It is an object of the present invention to provide a novel carrier synchronizing unit for a coherent detection data communication system over non-frequency selective fading channels wherein the redundancy in estimation of a fading channel multiplicative distortion is reduced to improve the reliability of the estimation and to compensate for an influence of a tracking delay in RLS estimation.

In order to attain the object described above, the present invention includes a carrier synchronizing unit which comprises pilot symbol interpolation type phase and amplitude estimation means for interpolating pilot symbols in order to estimate a phase and an amplitude of a multiplicative distortion of a transmission line by fading, recursive least square type phase and amplitude estimation means for estimating the phase and the amplitude of the multiplicative distortion of the transmission line by fading using a recursive least square method, distortion compensation means for compensating for the multiplicative distortion by fading, symbol decision means for deciding a received symbol by coherent detection, delay means for delaying at least a received signal, and means for periodically training the recursive least square type phase and amplitude estimation means. The carrier synchronizing unit combines pilot symbol interpolation and decision feedback recursive least square type phase and amplitude estimation by means of the pilot symbol interpolation type phase and amplitude estimation means and the recursive least square type phase and amplitude estimation means in a decision feedback configuration.

The distortion compensation means compensates for the phase and the amplitude of the multiplicative distortion of the transmission line by fading which is estimated by the pilot symbol interpolation type phase and amplitude estimation means. The output of the distortion compensation means is inputted to the symbol decision means and a symbol detected by the symbol decision means and a known pilot symbol are feedback inputted to the recursive least square type phase and amplitude estimation means so that the recursive least square type phase and amplitude estimation means calculates estimated values of the phase and the amplitude of the multiplicative distortion based on the feedback inputted symbol and the delayed received signal. The recursive least square type phase and amplitude estimation means of the decision feedback configuration takes charge of estimation at the second stage (in this instance, estimation at the first stage is performed by the pilot symbol interpolation type phase and amplitude estimation means).

As described above, the present invention provides a novel and improved unit for carrier synchronization. In the carrier synchronizing unit of the present invention, interpolation of a pilot symbol and decision feedback type recursive least square estimation are combined for carrier synchronization.

The carrier synchronizing unit of the present invention can be used for carrier synchronization in an open loop structure by using a free-running oscillator which mixes a received signal into a base band signal. Consequently, deterioration of the performance of the PLL can be avoided while deep fading is produced.

The present invention is suitably applied to a carrier synchronizing unit which is mounted in a digital system. The present invention enables synchronism which is free from a hang-up phenomenon and rapid phase acquisition is performed with a high probability of success. The carrier synchronizing unit exhibits an improved performance for a decision-directed carrier synchronizing structure which involves phase and amplitude estimation based on a conventional symbol interpolation method and a conventional recursive least square method.

The system proposed by the present invention can improve the accuracy of an estimated channel transmission function and can track a fading channel condition which varies at a very high rate.

In the present invention, a multiplicative distortion of a fading channel is first estimated using ordinary interpolation. Such estimation is used for fading compensation and pre-detection of data symbols.

If it is assumed that a receiver is operating in a region of a reasonable symbol error rate (a little lower than 0.5), the processing of eliminating data modulation using a pre-detected symbol is very satisfactory.

The pre-detected symbol is combined with a known pilot symbol and used for recursive least square estimation.

The phase and amplitude estimator (recursive least square estimator) which is based on the recursive least square method, estimates the multiplicative distortion of the fading channel using an adaptive algorithm of the recursive least square method which minimizes a time mean weighted square error.

The estimated value obtained by the recursive least square method is used for final fading compensation and symbol detection.

A high weighting coefficient, close to "1", must be used for the adaptive algorithm of the recursive least square method in order to reduce the influence of noise in estimated multiplicative distortion. However, the high weighting coefficient for the adaptive algorithm of the recursive least square method gives rise to a large tracking delay.

Although the tracking delay in estimation is deleterious to the decision-directed carrier synchronizing technique, in the present invention, it is compensated for simply by using a predetermined delay block, and carrier synchronization free from a hang-up phenomenon is achieved. By using information from several preceding slots for the current estimation in this manner, estimation based on the recursive least square method can be applied successively in time.

A minor defect is in that a delay and a buffer area are required for the receiver and similarly the complexity increases somewhat as compared with conventional estimation of the recursive least square method in a conventional decision-directed configuration.

However, in the present invention, since superior error performances and multi-value level signal standards become possible, the defects mentioned above are more than compensated for.

The system proposed by the present invention is very suitable for digital implementation.

Fading compensation by combining the pilot symbol interpolation and the estimation based on the decision feedback recursive least square method, provides improvement in the carrier tracking capability and all performances of the receiver.

By employing the system of the present invention, the required number of pilot symbols can be reduced or the time interval between pilot symbols can be increased as compared to an ordinary pilot symbol interpolation method.

Coherent detection in frequency-flat fading channels is advantageous over noncoherent detection when the issue of power efficiency is taken into consideration. However, carrier recovery necessary for coherent detection is influenced by the time-variation characteristic of the fading channel.

In the present invention, a novel and improved apparatus for carrier synchronization is proposed as described hereinabove. In particular, the apparatus of the present invention takes advantage of the superior characteristics of an adaptive algorithm based on the recursive least square method for fading channel multiplicative distortion estimation and simultaneously overcomes a hang-up phenomenon which is characteristic with a conventional decision-directed configuration.

A tracking delay in estimation based on the recursive least square method is overcome simply by use of a delay block for compensation.

Owing to the recursive least square estimation (RLS estimation), even if modulation has an influence similar to a multiplicative distortion, the modulation can be removed by using an ordinary symbol interpolation method.

The adaptive algorithm based on the recursive least square method for a fading channel multiplicative distortion estimation improves the accuracy and the reliability of estimation, gradually reduces the influence of additive noise and exhibits an improved performance as compared to an ordinary symbol interpolation method.

As described above, the present invention proposes decision feedback recursive least square (decision feedback RLS) estimation, and reduces the redundancy in the estimation of a multiplicative distortion of a fading channel and enhances the reliability of the estimation. Further, according to the present invention, a novel and improved method which compensates for an influence of a tracking delay in estimation based on the recursive least square method is proposed, and the improved system produces successive phase and amplitude estimated values eliminating deterioration of quality.

Further, the system of the present invention is advantageous in that it can improve the accuracy of an estimated fading channel function and can track a fading condition which varies at a very high rate.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
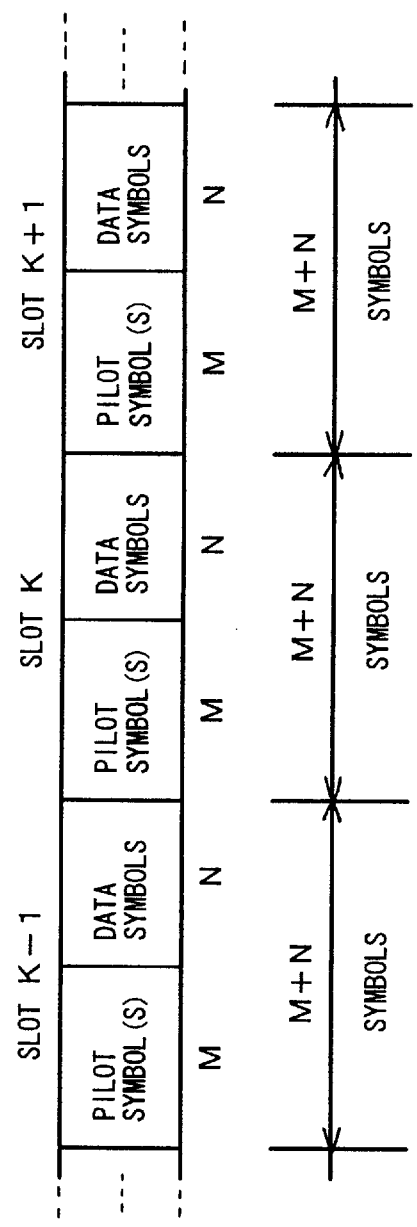
FIG. 1 is a diagrammatic view showing a construction of frame of a transmission system.

FIG. 1 illustrates the format of a frame of a transmission system employed in a carrier synchronizing unit according to the present invention. A transmitter periodically inserts a known symbol or symbols, that is, a pilot symbol or symbols, and the carrier synchronizing unit uses the pilot symbol or symbols for measurement of a channel transmission function in order to perform interpolation and training in phase and amplitude estimation processing based on the recursive least square method.

Figure 2:
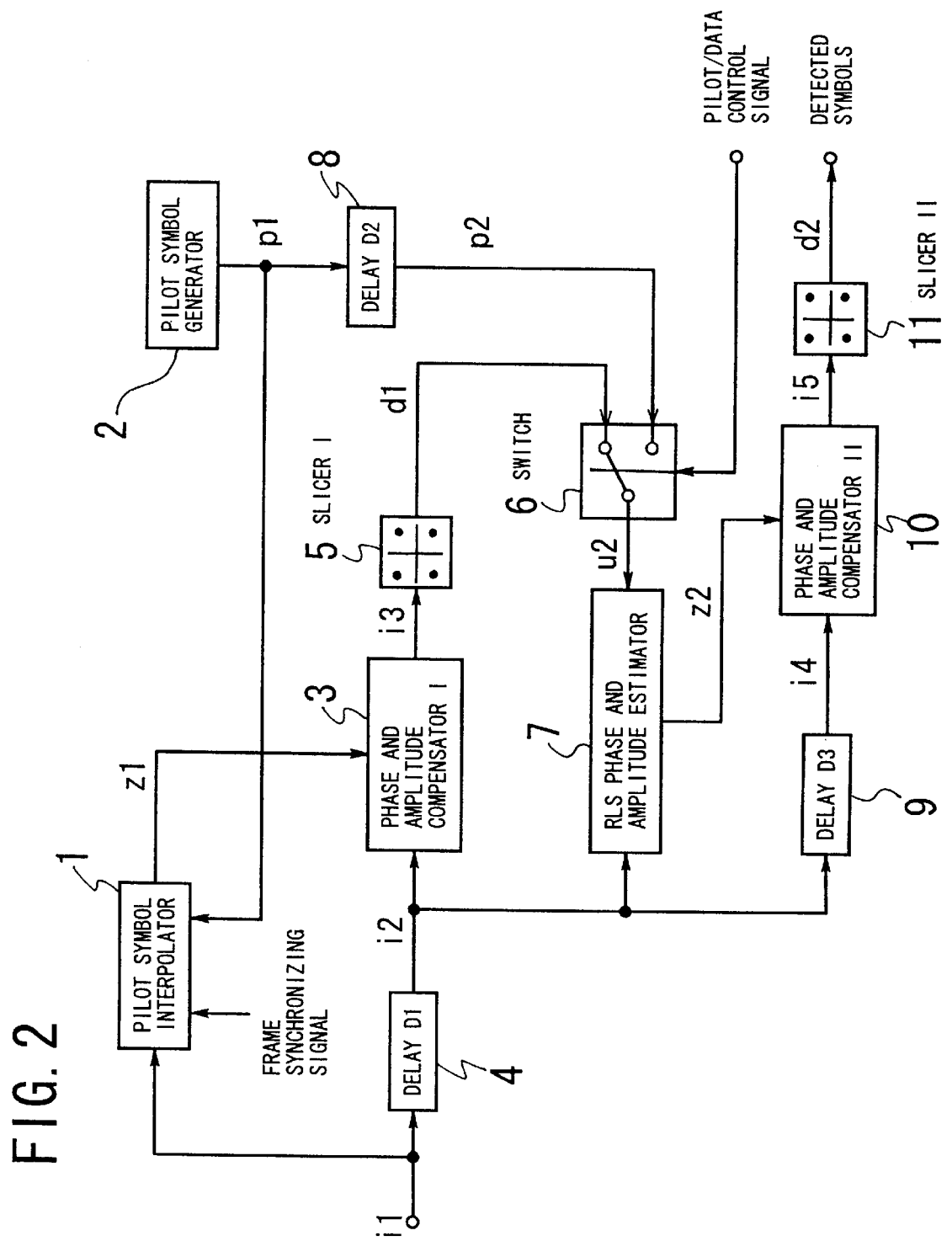
FIG. 2 is a block diagram showing a carrier synchronizing unit to which the present invention is applied.

FIG. 2 shows a block diagram of the carrier synchronizing unit according to the present invention in which a pilot symbol interpolation method and estimation based on a decision feedback recursive least square method are combined. An adaptive algorithm based on the recursive least square method is applied to estimation of a multiplicative distortion of a fading channel. Data modulation is removed by ordinary symbol interpolation in order to perform estimation based on the recursive least square.

Figure 3:
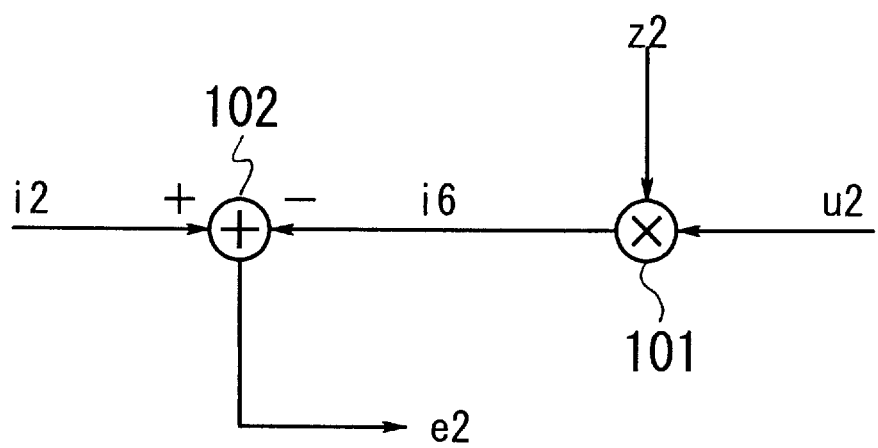
FIG. 3 is a diagrammatic view illustrating details of the phase and amplitude estimation processing employed in the carrier synchronizing unit of FIG. 2.

FIG. 3 illustrates details of phase and amplitude estimation processing by the carrier synchronizing unit according to the present invention. A multiplicative distortion is calculated using an adaptive algorithm based on the recursive least square method which minimizes a time-weighted square error between a received signal and an estimated value for the received signal. The estimated value for the received signal is formed by multiplying a detected symbol and a pilot symbol by an estimated value of a multiplicative distortion. It is to be noted that reception free from inter-symbol interference is assumed here.

Figure 4:
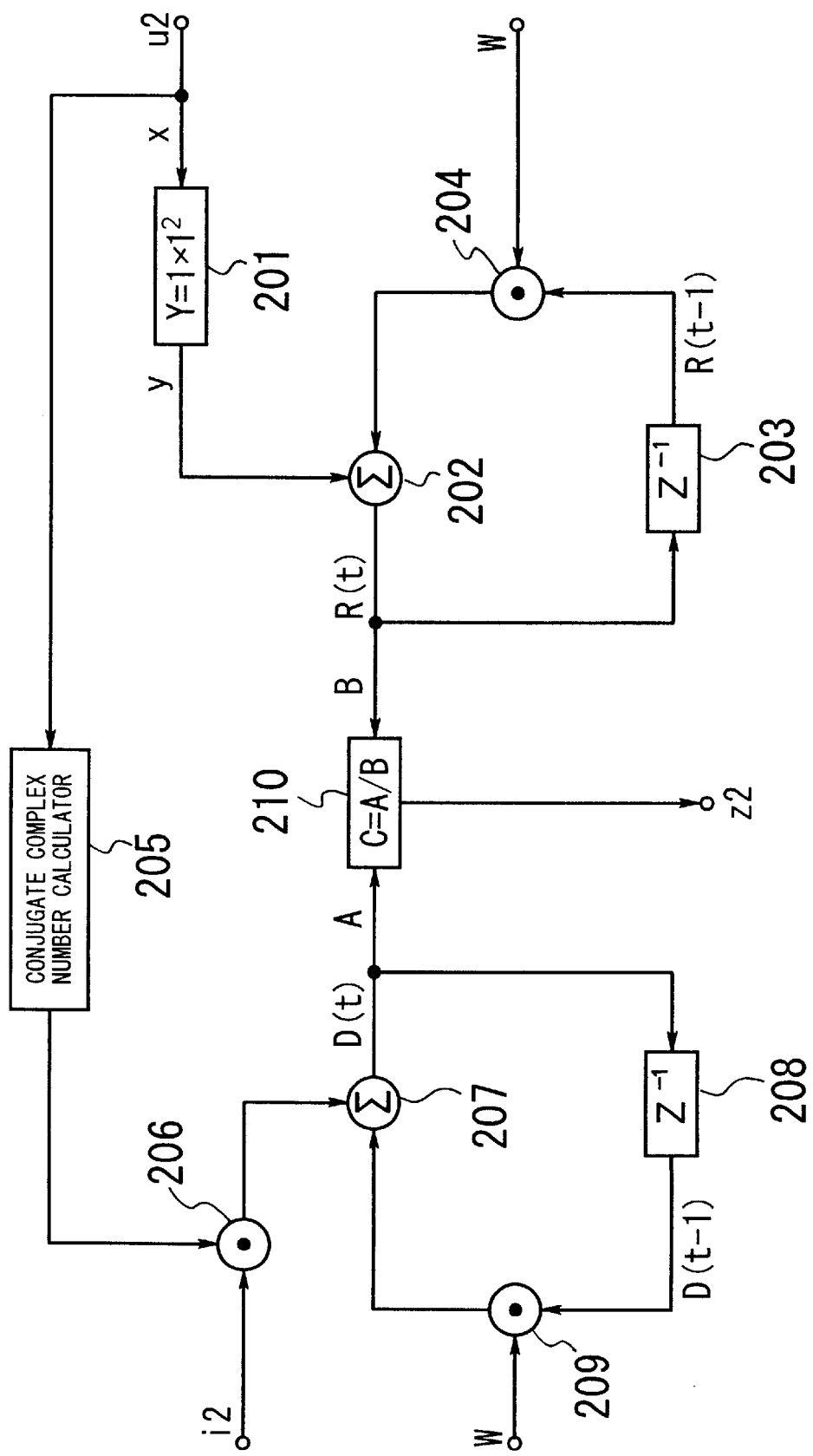
FIG. 4 is a flow diagram illustrating a calculation method for estimation based on the recursive least square employed in the carrier synchronizing unit of FIG. 2.

FIG. 4 illustrates a calculation method for estimation based on the recursive least square method employed in the carrier synchronizing unit according to the preferred embodiment of the present invention.

In the preferred embodiment of the present invention, the carrier synchronizing unit is constructed in a digital system.

A base band linear modulated received signal having a complex number value is used for estimation of a multiplicative distortion arising from fading. An in-phase component and a quadrature component of a multiplicative distortion arising from fading I/Q are low-pass processed so that they may be suitably used for I/Q estimation of a multiplicative distortion.

A low-pass filter characteristic (low-pass characteristic) of I/Q components of a multiplicative distortion arising from fading is verified in many physical measurement for terestial station-mobile station communication and aerospace satellite communication.

In the preferred embodiment of the present invention, phase and amplitude estimation is performed by estimating I/Q components of a multiplicative distortion. The magnitude of amplitude information obtained by such a method, that is, the magnitude of a multiplicative distortion of a complex number value, can also be used for precision automatic gain control (AGC) without a burden of the cost.

A diversity reception and a maximum ratio combining can be simply realized by using the present carrier synchronizing unit. This is because the carrier synchronizing unit presents an optimum estimated value of a channel gain.

The transmitter inserts a known symbol or symbols, that is, a pilot symbol or symbols, and the receiver uses the pilot symbol or symbols for extraction of a corresponding sample or samples and interpolates the pilot symbol or symbols to form an estimated value of a multiplicative distortion of a fading channel.

Such pilot symbol or symbols are used also for training of a phase and amplitude estimator which is based on the recursive least square method.

Such frame structure type transmission is schematically illustrated in FIG. 1. Referring to FIG. 1, each slot includes M pilot symbols and N data symbols. Use of pilot symbols does not cause any change in the waveform of a transmission pulse or any change of a peak to average power ratio. Accordingly, the complexity of the transmitter or receiver is not increased.

The transmitter repeats its processing such that M pilot symbols are transmitted first and then N data symbols are transmitted, whereafter new M pilot symbols are transmitted.

The ratio N/M is set to a value higher than 15 so that a loss caused by insertion of a known symbol can be ignored. The number M of pilot symbols of each frame (slot) normally ranges from 1 to 5. It is to be noted that, where the number M is larger than 1, samples corresponding to pilot symbols from one slot should be accumulated (integrated) and then averaged. The averaging of the samples remarkably decreases the influence of additive noise or interference. Use of averaged samples for interpolation improves the performance of the pilot symbol interpolation system.

Referring now to FIG. 2, a pilot symbol interpolator 1 extracts a phase and an amplitude from a received signal i1 using a known pilot symbol p1.

The pilot symbol interpolator 1 interpolates a channel measurement value provided by the pilot symbol to obtain an amplitude and phase reference z1 for pre-detection of data.

Ordinary pilot symbol interpolation is known in the prior art for fading compensation. Low-order Gaussian interpolation, low-pass filter interpolation, or linear interpolation can be applied in this instance.

Linear interpolation will be described below in outline. A fading channel brings about a multiplicative distortion, and a channel measurement value given by a pilot symbol is obtained (estimated) by dividing a corresponding sample of the received signal i1 by the pilot symbol p1. Such estimated values are distorted by noise.

If the number M of pilot symbols is larger than 1, then the influence of noise can be reduced by averaging those estimated values for one slot. In this instance, it is assumed that the fading transmission function is fixed within a period of M successive pilot symbols.

The phase and amplitude reference z1 is estimated by linear interpolation of channel measurements for two successive slots.

Since a measurement value of a fading channel estimated with pilot symbols from at least two slots is used, whatever requirement is made for interpolation, the interpolation inevitably gives rise to a delay.

Interpolation for an I component and a Q component of a fading multiplicative distortion is performed. Also the phase and amplitude reference z1 can be estimated by low-order Gaussian interpolation (or Gaussian filter) or low-pass interpolation within one slot. It is to be noted that a polyphase filter network structure may be applied to low-pass interpolation.

Referring to FIG. 2, a phase and amplitude compensator I indicated by the block 3 uses the phase and amplitude reference z1 estimated by the pilot symbol interpolator 1 for fading compensation. The phase and amplitude compensator 3 multiplies a received signal i2 by a complex number value 1/z1 in order to compensate for a fading distortion.

A delay unit D1 indicated by the block 4 is introduced in order to compensate for a delay arising from symbol interpolation by the pilot symbol interpolator 1.

A slicer I, block 5, uses as an input the signal i3 generated by the phase and amplitude compensator I. The slicer 5 outputs a detection symbol d1 (this is called symbol decision). Such detected symbols are detected for use in the estimation of a phase and an amplitude based on the recursive least square method and do not necessarily match with an actual detection process of a receiver.

The coherently detected symbol d1 is coupled to a pilot symbol p2 by a switch 6 for use in estimation based on the recursive least square method. However, frame synchronism is assumed, and consequently, the local pilot symbol generator 2 and control of the switch 6 are synchronized with frame structure transmission. In the present embodiment, symbol timing synchronism and reception free from inter-symbol interference are assumed. A delay unit D2, introduced by the block 8, is the same as the delay unit D1 of the block 4. Also the delay unit D2 compensates for a delay for interpolation.

A phase and amplitude estimator (RLS phase and amplitude estimator) 7 extracts a phase and an amplitude from the delayed received signal i2 in accordance with an adaptive algorithm based on the recursive least square method using the detected symbols d1 and the known pilot symbols p2.

FIG. 3 illustrates details of the phase and amplitude estimation processing based on the recursive least square adaptive algorithm.

A symbol train u2 is formed by time-division multiplexing the detected symbols d1 and the pilot symbols p2 by means of the switch 6 shown in FIG. 2. The symbol train u2 and the delayed received signal i2 are used as inputs to the phase and amplitude estimator 7 which is based on the recursive least square method. Meanwhile, an output of the RLS phase and amplitude estimator 7 is denoted by z2 and is inputted to a phase and amplitude compensator 10.

An estimated value of a received signal i6 is produced by multiplying the estimated value z2 of the multiplicative distortion by the symbol train u2 by means of a multiplier 101.

An error signal e2 is calculated by subtracting the received signal estimated value i6 from the received signal i2 by means of a subtractor 102.

The base band received signal i2 is sampled for each symbol period, that is, once at time $\{nTs\}$ and provides a sample $\{i2(n)\}$ to be used for estimation by the phase and amplitude estimator 7 which is based on the recursive least square method. Reference character Ts denotes a symbol period.

The estimated value of the fading channel multiplicative distortion is outputted at time $\{nTs\}$ so that a sample $\{z2(n)\}$ is obtained.

Also the input symbol u2 is sampled at the symbol data rate and is represented by sampling $\{u2(n)\}$ at time $\{nTs\}$.

The signals i2, i6, z2 and e2 are complex number value signals having I/Q orthogonal components.

The adaptive algorithm based on the recursive least square minimizes the time-averaged weighted square error e2. A weight applied to any error e2 decreases exponentially as the time of the error passes, and the algorithm minimizes Et of the following equation (1):

$$Et = \sum_{n=0}^{t} |e2(n)|^2 W^{t-n} \quad 0 < W < 1 \qquad (1)$$

where W is a weighting coefficient for the adaptive algorithm based on the recursive least square method (RLS).

It is to be noted that the algorithm for the recursive least square method is known as the prior art.

Here, the fading channel multiplicative distortion is modeled by a multiplication with scalar complex-valued signal z2, and the algorithm of the recursive least square method has a simplified form.

The signal u2 is regarded as an input signal; the signal z2 is regarded as an estimation coefficient; and $e2 = i2 - z2 \cdot u2$ is an error signal. If Et of the equation (1) above is minimized with respect to z2, the following equation (2) is obtained in accordance with the algorithm based on the recursive least square method:

$$R(t) \cdot Z2(t) = D(t) \qquad (2)$$

where R(t) is a signal correlation value defined by the following equation (3):

$$Rt = \sum_{n=0}^{t} W^{t-n} \cdot u2(n) \cdot u2^*(n) \qquad (3)$$

Meanwhile, D(t) is a cross-correlation value defined by the following equation (4):

$$Dt = \sum_{n=0}^{t} W^{t-n} \cdot i2(n) \cdot u2 \cdot (n) \quad (4)$$

where $u2^*(n)$ is a conjugate complex number of $u2(n)$.

The value $u2(n) \cdot u2^*(n)$ is equal to a square of the magnitude of $u2(n)$ and has a real value, and also the signal correlation value $R(t)$ has a real value. The solution of the equation (2) is given by the following equation (5):

$$z2(t) = \frac{D(t)}{R(t)} \quad (5)$$

$$= \frac{\sum_{n=0}^{t} W^{t-n} \cdot i2(n) \cdot u2 \cdot (n)}{\sum_{n=0}^{t} W^{t-n} \cdot u2(n) \cdot u2 \cdot (n)}$$

$R(t)$ is recursively calculated from $R(t-1)$ which is the value prior by one sample period in accordance with the following equation (6):

$$R(t) = W \cdot R(t-1) + u2(t) \cdot u2^*(t) \quad (6)$$

Also $D(t)$ is calculated recursively in accordance with the following equation (7):

$$D(t) = W \cdot D(t-1) + i2(t) \cdot u2^*(t) \quad (7)$$

Consequently, the multiplicative distortion estimated value $z2(t)$ of a fading channel is calculated recursively in accordance with the following equation (8):

$$z2(t) = \frac{W \cdot D(t-1) + i2(t) \cdot u2 \cdot (t)}{W \cdot R(t-1) + u2(t) \cdot u2 \cdot (t)} \quad (8)$$

FIG. 4 illustrates details of the processing for the phase and amplitude estimator 7 illustrated in FIG. 2 based on the recursive least square method and according to equation (8).

Calculation of the numerator of the equation (8) above is performed by the blocks 201, 202, 203 and 204. Those blocks perform scalar calculation. The block 203 introduces a one sample delay; the block 202 is an adder; and the block 204 is a multiplier.

Calculation of the denominator of the equation (8) above is performed by the blocks 205, 206, 207, 208 and 209. Those blocks perform calculation of complex numbers. The block 205 performs calculation of a conjugate complex number; the block 208 introduces a one sample delay; the block 207 is an adder; and the blocks 206 and 209 are multipliers.

The calculation for division of the equation (8) above is indicated by the block 210.

In FIG. 4, representation of a conventional method of calculation for estimation based on the recursive least square is schematically given. Various modifications of the calculation may be utilized by those skilled in the art.

In order to reduce the influence of noise upon multiplicative distortion estimation, the weighting coefficient for the adaptive algorithm W based on the recursive least square method must be close to "1". Although a high weighting coefficient reduces the influence of additive noise to the estimated value z2, it simultaneously introduces a slower response to a variation of the multiplicative distortion (that is, it increases a tracking delay). This tracking delay is destructive to the decision-directed carrier synchronization architecture.

In the present embodiment, the influence of a tracking delay is compensated for by the delay block.

The delay unit D3 of the block 9 of FIG. 2 is used to compensate for a delay introduced by the RLS phase and amplitude estimator 7. A tracking delay in estimation based on the recursive least square method is a function of a weighting coefficient, and the fixed delay unit D3 is proposed for the selected weighting coefficient.

Estimation based on the recursive least square method is applied continuously in time using a method which uses information from a preceding slot for current estimation, by which the estimation accuracy is improved.

In the present embodiment, carrier synchronization free from hang-up is achieved and phase synchronism free from ambiguity is achieved without involving a problem of an irregular jump of a phase reference or without re-acquisition problems of a PLL or a similar phase tracking system. Since an accurate phase and amplitude reference is supplied, multi-value modulation such as multi-phase shift keying (M-PSK) or multi-value quadrature amplitude modulation (M-QAM) becomes possible by the present embodiment.

Referring to FIG. 2, a compensator II indicated by the block 10 uses the multiplicative distortion z2 estimated based on the recursive least square method for final fading compensation of a received signal i4. The compensator II multiplies the received signal i4 by the complex number 1/z2.

If channel coding is used, then soft information data can be obtained from the output of the fading compensator II. Slicer II, indicated by the block 11 in FIG. 2, uses compensated signal i5 to perform a final decision and outputs a coherent detected symbol (detected symbol) d2. The signals i1, i2, i3, i4, i5, d1, d2, p1, p2, z1 and z2 are complex-valued signals having I/Q orthogonal components.

Having now fully described the invention, it will be apparent to one of ordinary skill in the art that many changes and modifications can be made thereto without departing from the spirit and scope of the invention as set forth herein.

What is claimed is:

1. A carrier synchronizing unit for use in a receiver for receiving a signal containing symbols, said carrier synchronizing unit comprising:

pilot symbol interpolation type phase and amplitude estimation means for interpolating a pilot symbol to estimate a phase and an amplitude of a multiplicative distortion of a transmission line caused by fading;

recursive least square type phase and amplitude estimation means for estimating the phase and the amplitude of the multiplicative distortion using a recursive least square method;

first phase and amplitude compensation means for compensating for the multiplicative distortion using said estimated value from said pilot symbol interpolation type phase and amplitude estimation means;

second phase and amplitude compensation means for compensating for the multiplicative distortion using said estimated value from said recursive least square type phase and amplitude estimation means;

first symbol decision means for detecting a symbol using an output of said first phase and amplitude compensation means, an output of said first symbol decision means being coupled to an input of said recursive least square type phase and amplitude estimation means;

second symbol decision means for detecting a symbol using an output of said second phase and amplitude compensation means, said second symbol decision means outputting a coherent detected symbol;

delay means for delaying at least the received signal, an output of said delay means being coupled to at least an input of said first phase and amplitude compensation means; and means for periodically training said recursive least square type phase and amplitude estimation means.

2. A carrier synchronizing unit as claimed in claim 1, wherein said distortion compensation means compensates for the phase and the amplitude of the multiplicative distortion estimated by said pilot symbol interpolation type phase and amplitude estimation means, an output of the distortion compensation means is inputted to said symbol decision means and a symbol detected by said symbol decision means and a known pilot symbol are then inputted to said recursive least square type phase and amplitude estimation means, said recursive least square type phase and amplitude estimation means calculates estimated values of the phase and the amplitude of the multiplicative distortion based on the inputted symbols and the delayed received signal.

3. A carrier synchronizing unit as claimed in claim 1, wherein said pilot symbol interpolation type phase and amplitude estimation means extracts samples corresponding to the pilot symbol from the received signal, extracts phases and amplitudes of the samples and interpolates the phases and the amplitudes of the samples using an interpolation method and forms an estimated value of the multiplicative distortion.

4. A carrier synchronizing unit as claimed in claim 1, wherein said recursive least square type phase and amplitude estimation means uses an adaptive algorithm of a recursive least square method which minimizes a time mean value of a weighted square error.

5. A carrier synchronizing unit as claimed in claim 4, further comprising means for using periodically inserted known symbols or pilot symbols for training of said recursive least square type phase and amplitude estimation means in order to improve the reliability of estimation of the multiplicative distortion.

6. A carrier synchronizing unit as claimed in claim 1, wherein said first phase and amplitude compensation means includes means operatively connected to an output of said pilot symbol interpolation type phase and amplitude estimation means for performing calculation processing for compensation for the phase and the amplitude of the received signal.

7. A carrier synchronizing unit as claimed in claim 1, wherein said second phase and amplitude compensation means includes means operatively connected to an output of said recursive least square type phase and amplitude estimation means for performing calculation processing for compensation for the phase and the amplitude of the delayed received signal.

8. A carrier synchronizing unit as claimed in claim 1, wherein said delay means is a first delay means for compensating for a delay produced by interpolation by said pilot symbol interpolation type phase and amplitude estimation means, said carrier synchronizing unit further comprising:

a second delay means for compensating for a tracking delay of said recursive least square type phase and amplitude estimation means, an output of said second delay means being coupled to an input of said second phase and amplitude compensation means.

9. A carrier synchronizing unit as claimed in claim 1, further comprising:

a pilot symbol delay means for delaying a pilot symbol generated in the inside of said receiver to compensate for the interpolation delay created by said pilot symbol interpolation type phase and amplitude estimation means, an output of said pilot symbol delay means being coupled to an input of said recursive least square type phase and amplitude estimation means.

10. A carrier synchronizing unit as claimed in claim 8, wherein said second delay means includes means for delaying the received signal to compensate for a tracking delay caused by said recursive least square type phase and amplitude estimation means, and the tracking delay of said recursive least square type phase and amplitude estimation means is a function of a weighting coefficient of the recursive least square method and a delay is inserted in response to a selected weighting coefficient.

11. A carrier synchronizing unit as claimed in claim 1, wherein said training means includes means for generating a pilot symbol in the inside of said receiver, and means for time division multiplexing the pilot symbol and a decision symbol to produce a frame, and a frame synchronizing system is mounted in said receiver.

* * * * *